(12) United States Patent
Limon et al.

(10) Patent No.: US 12,475,425 B2
(45) Date of Patent: Nov. 18, 2025

(54) METHOD FOR EVALUATING ELECTRONIC DOCUMENTS

(71) Applicant: FMR LLC, Boston, MA (US)

(72) Inventors: Ali Limon, Hopkinton, MA (US);
Vineel Gujjar, Cumberland, RI (US);
Lisa Huang, Boston, MA (US)

(73) Assignee: FMR LLC, Boston, MA (US)

( * ) Notice: Subject to any disclaimer, the term of this patent is extended or adjusted under 35 U.S.C. 154(b) by 251 days.

(21) Appl. No.: 18/210,859

(22) Filed: Jun. 16, 2023

(65) Prior Publication Data

US 2024/0420062 A1    Dec. 19, 2024

(51) Int. Cl.
| | |
|---|---|
| *G06Q 10/0639* | (2023.01) |
| *G06F 40/205* | (2020.01) |
| *G06F 40/295* | (2020.01) |
| *G06V 30/19* | (2022.01) |
| *G06V 30/412* | (2022.01) |

(52) U.S. Cl.
CPC ..... *G06Q 10/06393* (2013.01); *G06F 40/205* (2020.01); *G06F 40/295* (2020.01); *G06V 30/19093* (2022.01); *G06V 30/412* (2022.01)

(58) Field of Classification Search
CPC ............ G06Q 10/06393; G06F 40/205; G06F 40/295; G06V 30/19093; G06V 30/412
See application file for complete search history.

(56) References Cited

U.S. PATENT DOCUMENTS

| | | | | |
|---|---|---|---|---|
| 2016/0065628 | A1* | 3/2016 | Guo | G06Q 50/01 709/204 |
| 2019/0102710 | A1* | 4/2019 | Predescu | G06F 16/248 |
| 2021/0357775 | A1* | 11/2021 | Chen | G06F 16/258 |
| 2022/0019604 | A1* | 1/2022 | Davlos | G06N 7/01 |
| 2024/0211504 | A1* | 6/2024 | Jeong | G06N 3/045 |
| 2024/0354436 | A1* | 10/2024 | Mukherjee | G06F 16/3344 |

OTHER PUBLICATIONS

Langville, et al., A Survey of Eigenvector Methods for Web Information Retrieval, SIAM Review, 2005, pp. 135-161, vol. 47, No. 1, epubs.siam.org/doi/pdf/10.1137/S0036144503424786.
Page, et al., The PageRank Citation Ranking: Bringing Order to the Web., The Web Conference, 1999, ilpubs.stanford.edu:8090/422.

* cited by examiner

*Primary Examiner* — Darioush Agahi
(74) *Attorney, Agent, or Firm* — Cesari and McKenna, LLP (57) ABSTRACT

A method for evaluating electronic documents based on a framework having a plurality of labels includes receiving a plurality of electronic documents, each electronic document having a company identifier. The method includes extracting a plurality of input sentences from each electronic document. The method includes generating a plurality of input sentence embeddings, each input sentence embedding corresponding to one of the input sentences. The method includes generating a plurality of label embeddings, each label embedding corresponding to one of the labels. The method includes calculating a plurality of similarity measures between each of the input sentence embeddings and each of the label embeddings. The method includes generating a plurality of label sentences for each of the labels based on the similarity measures, each of the label sentences being associated with one of the company identifiers. The method includes generating a plurality of entities for each of the label sentences.

18 Claims, 7 Drawing Sheets

| 3 Pillars | 10 Themes | 35 ESG Key Issues | |
|---|---|---|---|
| Environment | Climate Change | Carbon Emissions<br>Product Carbon Footprint | Financing Environmental Impact<br>Climate Change Vulnerability |
| | Natural Capital | Water Stress<br>Biodiversity & Land Use | Raw Material Sourcing |
| | Pollution & Waste | Toxic Emissions & Waste<br>Packaging Material & Waste | Electronic Waste |
| | Environmental Opportunities | Opportunities in Clean Tech<br>Opportunities in Green Building | Opportunities in Renewable Energy |
| Social | Human Capital | Labor Management<br>Health & Safety | Human Capital Development<br>Supply Chain Labor Standards |
| | Product Liability | Product Safety & Quality<br>Chemical Safety<br>Consumer Financial Protection | Privacy & Data Security<br>Responsible Investment<br>Health & Demographic Risk |
| | Stakeholder Opposition | Controversial Sourcing<br>Community Relations | |
| | Social Opportunities | Access to Communications<br>Access to Finance | Access to Health Care<br>Opportunities in Nutrition & Health |
| Governance | Corporate Governance | Ownership & Control<br>Board | Pay<br>Accounting |
| | Corporate Behavior | Business Ethics<br>Tax Transparency | |

METHOD FOR EVALUATING ELECTRONIC DOCUMENTS

BACKGROUND

Technical Field

The present invention relates to automated evaluation of electronic documents, and more specifically to automatically evaluating electronic documents based on a framework with labels.

Background

Environmental, social, and corporate governance (ESG) is a business framework for considering environmental issues and social issues in the context of corporate governance. It is part of an organization's strategy that considers the needs and ways in which to generate value for all organizational stakeholders (such as employees, customers, suppliers, and financiers). In an investment context, it may be desirable for an investor to invest in companies whose ESG policies align with the policies of the investor. To this end, a multitude of ESG-related documents published by a company that is a candidate for investment need to be analyzed based on a framework that defines the investor's policies. These documents usually lack appropriate labels and/or structure to align them with the investment framework as they normally are unstructured documents. Therefore, typical approaches for analyzing and evaluating ESG policies in the investment context rely on manual work performed by analysts reading thousands of documents to incorporate information related to ESG into financial models with unchangeable ESG frameworks. In addition, the manual work needs to be performed again each time the investment framework is modified.

SUMMARY

The deficiencies of the prior art are overcome by providing methods and systems to evaluate company ESG using state-of-the-art natural language processing (NLP) and graph models with minimum human supervision that provide flexibility for augmented ESG research and analysis. In accordance with an embodiment of the present invention, a computer-implemented method for evaluating electronic documents based on a framework having a plurality of labels. The method includes receiving, by a computer system, a plurality of electronic documents, each one of the plurality of electronic documents having a company identifier. The method includes extracting, by the computer system, a plurality of input sentences from each one of the plurality of electronic documents. The method also includes generating, by the computer system using a machine learning model, a plurality of input sentence embeddings, each one of the plurality of input sentence embeddings corresponding to one of the plurality of input sentences. The method includes generating, by the computer system using the machine learning model, a plurality of label embeddings, each one of the plurality of label embeddings corresponding to one of the plurality of labels. The method further includes calculating, by the computer system, a plurality of similarity measures between each one of the plurality of input sentence embeddings and each one of the plurality of label embeddings. The method includes generating, by the computer system, a plurality of label sentences for each one of the plurality of labels based on the plurality of similarity measures, each one of the plurality of label sentences being associated with one of the company identifiers. The method also includes generating, by the computer system, a plurality of entities for each one of the plurality of label sentences.

Alternatively, or in addition, generating the plurality of label sentences includes thresholding the plurality of similarity measures. The plurality of similarity measures may be pairwise cosine similarity values.

Also alternatively, or in addition, the network includes a plurality of entity nodes and a plurality of company node. Calculating the score further includes calculating, by the computer system, a PageRank score for each one of the plurality of entity nodes. Calculating the score includes calculating, by the computer system, a plurality of company-label scores based on an average of the PageRank scores of all entity nodes associated with a corresponding one of the plurality of label sentences. Calculating the score also includes calculating, by the computer system, the score based on the plurality of company-label scores.

Alternatively, or in addition, calculating the score is based on all company-label scores. Calculating the score may be based on a subset of the plurality of company-label scores associated with selected ones of the plurality of labels. Generating the plurality of entities may be based on an entity database. Each one of the plurality of electronic documents may have a date, and generating the network may be further based on the plurality of dates. The electronic documents may be ESG documents, and the score may be an ESG score.

In accordance with another embodiment of the present invention, a system for evaluating electronic documents based on a framework having a plurality of labels includes a computer system having a processor coupled to a memory. The system also includes a machine learning model residing on the computer system and configured to be executed by the processor. The processor is configured to receive a plurality of electronic documents, each one of the plurality of electronic documents having a company identifier. The processor is configured to extract a plurality of input sentences from each one of the plurality of electronic documents. The processor is also configured to generate, using the machine learning model, a plurality of input sentence embeddings, each one of the plurality of input sentence embeddings corresponding to one of the plurality of input sentences. The processor is further configured to generate, using the machine learning model, a plurality of label embeddings, each one of the plurality of label embeddings corresponding to one of the plurality of labels. The processor is configured to calculate a plurality of similarity measures between each one of the plurality of input sentence embeddings and each one of the plurality of label embeddings. The processor is also configured to generate a plurality of label sentences for each one of the plurality of labels based on the plurality of similarity measures, each one of the plurality of label sentences being associated with one of the company identifiers. The processor is further configured to generate a plurality of entities for each one of the plurality of label sentences. The processor is configured to generate a network based on the plurality of label sentences, the plurality of entities, and the plurality of company identifiers associate with the plurality of label sentences. The processor is also configured to calculate a score based on the network.

Alternatively, or in addition, the processor is further configured to generate the plurality of label sentences based on thresholding the plurality of similarity measures. The plurality of similarity measures may be pairwise cosine similarity values.

Also alternatively, or in addition, the network includes a plurality of entity nodes and a plurality of company node. The processor is further configured to calculate a PageRank score for each one of the plurality of entity nodes. The processor is also configured to calculate a plurality of company-label scores based on an average of the PageRank scores of all entity nodes associated with a corresponding one of the plurality of label sentences. The processor is further configured to calculate the score based on the plurality of company-label scores.

Alternatively, or in addition, the processor is configured to calculate the score based on all company-label scores. The processor may be configured to calculate based on a subset of the plurality of company-label scores associated with selected ones of the plurality of labels. The processor may be configured to generate the plurality of entities based on an entity database. Each one of the plurality of electronic documents may have a date, and the processor may be configured to generate the network based on the plurality of dates. The electronic documents may be ESG documents, and the score may be an ESG score.

In accordance with yet another embodiment of the present invention, a non-transitory computer-readable medium has software encoded thereon evaluating electronic documents based on a framework having a plurality of labels. The software, when executed by one or more processors, is operable to receive a plurality of electronic documents, each one of the plurality of electronic documents having a company identifier. The software is operable to extract a plurality of input sentences from each one of the plurality of electronic documents. The software is also operable to generate, using a machine learning model, a plurality of input sentence embeddings, each one of the plurality of input sentence embeddings corresponding to one of the plurality of input sentences. The software is further operable to generate, using the machine learning model, a plurality of label embeddings, each one of the plurality of label embeddings corresponding to one of the plurality of labels. The software is operable to calculate a plurality of similarity measures between each one of the plurality of input sentence embeddings and each one of the plurality of label embeddings. The software is also operable to generate a plurality of label sentences for each one of the plurality of labels based on the plurality of similarity measures, each one of the plurality of label sentences being associated with one of the company identifiers. The software is operable to generate a plurality of entities for each one of the plurality of label sentences. The software is also operable to generate a network based on the plurality of label sentences, the plurality of entities, and the plurality of company identifiers associated with the plurality of label sentences. The software is operable to calculate a score based on the network.

Alternatively, or in addition, each one of the plurality of electronic documents has a date, and the software is further operable to generate the network based on the plurality of dates.

BRIEF DESCRIPTION OF THE DRAWINGS

The description below refers to the accompanying drawings, of which.

DETAILED DESCRIPTION OF ILLUSTRATIVE EMBODIMENTS

Figure 1:
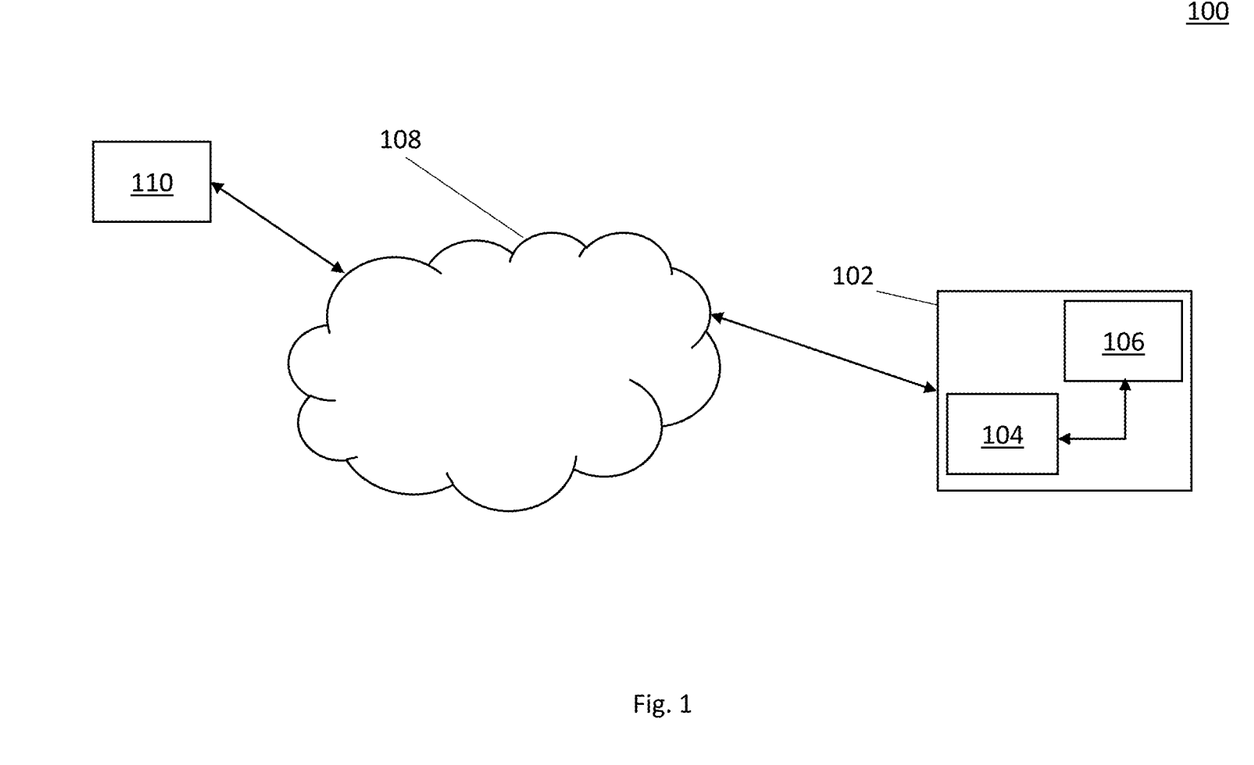
FIG. 1 is an illustration of a system for evaluating electronic documents in accordance with an embodiment of the present invention.

FIG. 1 is an illustration of a system 100 for evaluating electronic documents in accordance with an embodiment of the present invention. System 100 includes a computer system 102. The computer system 102 has a processor 104 coupled to a memory 106. The computer system 102 may also be communicatively coupled to a communications network 108. Network 108 may be a public network, such as the internet, or it may be a private network, such as a network internal to a company. Network 108 also may be a combination of public and/or private networks. The computer system 102 may be coupled to the network 108 directly, for example via an Ethernet cable or via wireless connection such as Wi-Fi. The computer system 102 may also be coupled to the network 108 in any other way known to the skilled person, for example indirectly through another device (not shown), such, as, but not limited to, a router, a switch, a hub, a separate computer system, a mobile device, a modem, and/or a combination of these devices. The processor 104 is configured to execute the method described below in detail with reference to FIG. 2. While a processor 104 is described herein, it is expressly contemplated that the computer system 102 has a plurality of processors. In that case, each of the plurality of processors of computer system 102 is coupled to the memory 106 and is configured to execute the method described below. In addition, while the computer system 102 is shown in FIG. 1 as including a processor 104 coupled to a memory 104, it is expressly contemplated that the computer system 102 includes a plurality of processors, each coupled to its only memory. The plurality of processors and corresponding memories may, for example, communicate with one another over the network 108 and may be configured to collectively execute the method described below with reference to FIG. 2.

Further coupled to the network 108 may be a database 110. The database 110 may be provided by any publicly available database system known to the skilled person. It may be a commercial database or an open-source database. While the database 110 is shown here coupled to the network 108, it is also expressly contemplated that the database 110 may be hosted on the computer system 102. The database 110 allows the computer system 102 to store and retrieve data.

Figure 2:
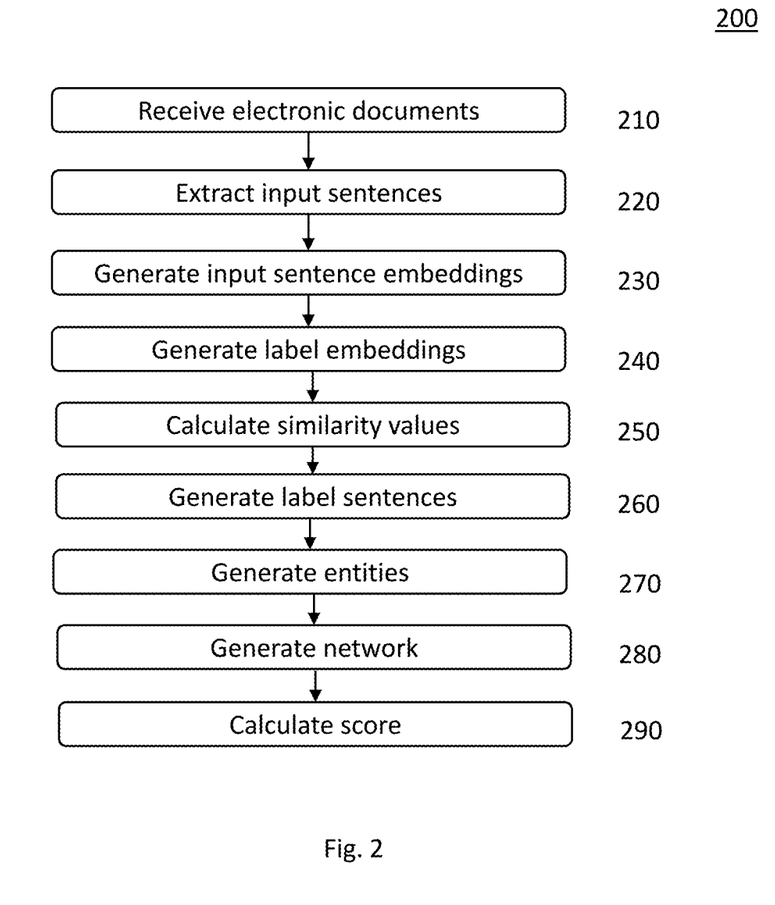
FIG. 2 is a flowchart of a method for evaluating electronic documents in accordance with an embodiment of the present invention.

FIG. 2 is a flowchart of a computer-implemented method 200 for evaluating electronic documents in accordance with an embodiment of the present invention. Specifically, method 200 may be executed by processor 104 of computer system 102 as described above with reference to FIG. 1. Similar to what is described above, the computer system 102 is coupled to a communications network 108. Also coupled to the communications network, or hosted on the computer system 102, is a database 110, as described above.

In step 210, the computer system 102 receives a plurality of electronic documents. The electronic documents may be received in any manner known to the skilled person. For example, the electronic documents may be retrieved from a network location, from a file system, or from a database such as database 110. The documents may also be received from a web scraping process that collects documents from company websites. The web scraper may collect all or some documents found on a website, it may collect all or some documents found in a specific section of a website, or it may collect all or some documents that contain specific keywords. Such a keyword filter reduces noise in the collected set of documents as it excludes documents that are most likely not relevant. For example, a web scraper may use a keyword filter that only collects documents that include the term "environment."

Figure 3:
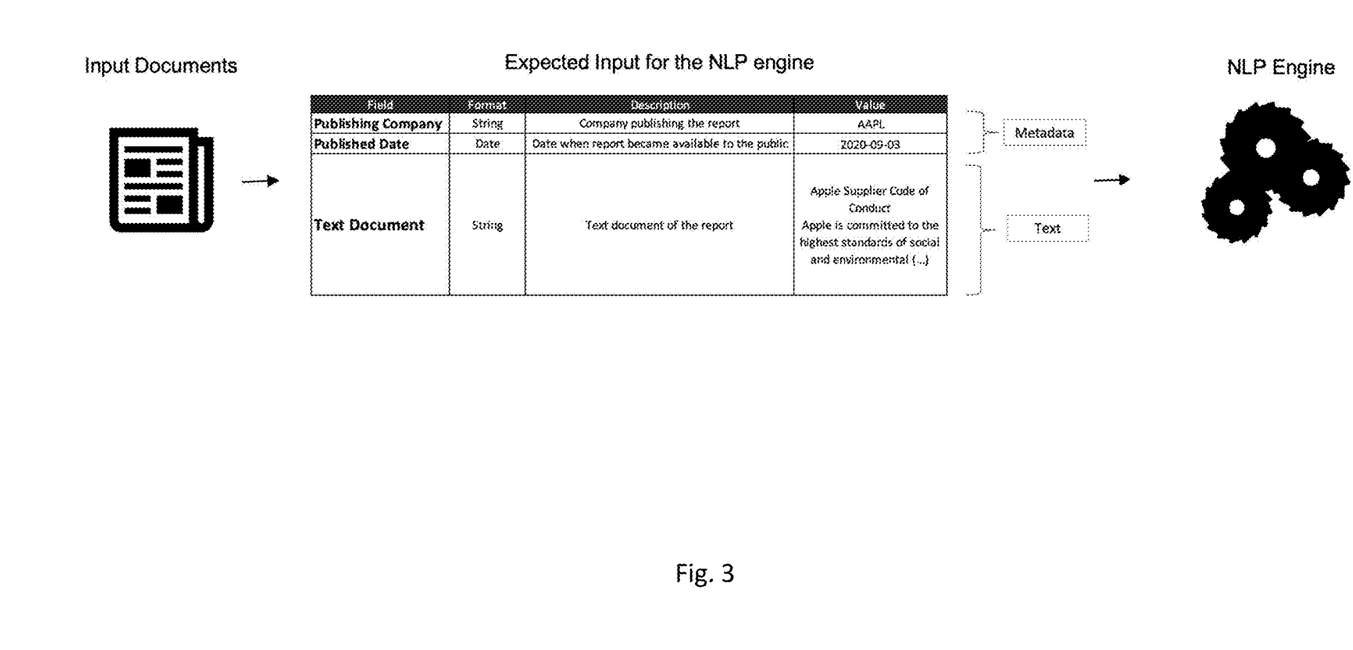
FIG. 3 is an illustration of data in an input document in accordance with an embodiment of the present invention.

Each one of the electronic documents has a company identifier. FIG. 3 shows an illustration of exemplary data associated with one of the input documents. The metadata includes an identifier of the company that published the document. This data may be in form of the company name, the company's stock symbol/ticker symbol, an identifying code for the company's securities, and/or any other company identifier known to the skilled person. Each one of the electronic documents also may have a date. The date may correspond to the date when the document was written and/or generated, when it was published, when it was last updated, or when any other changes to the document were made. While FIG. 3 includes in the metadata the date when the document became available to the public, it is expressly contemplated that an electronic document may not have a date, or that the date information is not stored and/or used. In addition to the metadata, company identifier and date, each electronic document received also includes the text of the document. The text of the document and its associated metadata may be stored by the computer system 102, for example in database 110. The text may be stored as a string without any other additional information such as formatting, structure, and/or images. It is also to be noted that additional quality checks may be performed on the received documents to filter out documents that are not relevant. For example, the web scraper may filter out documents that are too short, too long, and/or that were not published in a desired date range. The web scraper also may only consider documents that are found in specific sections of a company's website. For example, the web scraper may only collect investor reports, corporate responsibility reports, and/or ethics or conduct reports. In addition, while ESG documents are described herein, it is expressly noted that any electronic document may be analyzed and evaluated.

Figure 4:
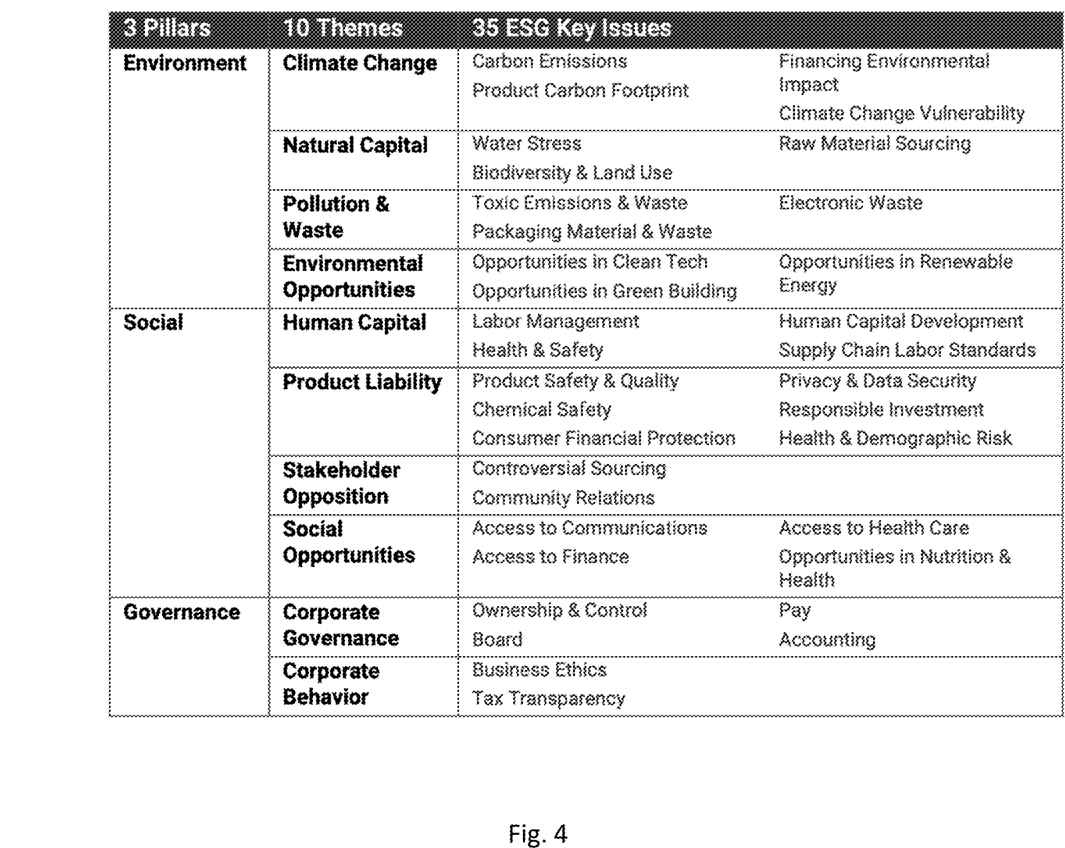
FIG. 4 is an illustration of a framework having a set of labels in accordance with an embodiment of the present invention.

To evaluate and score the electronic documents received, the computer system 102 uses a framework that has a plurality of labels. An example of such a framework, MSCI Key Issues, is shown in FIG. 4. The framework shown here includes 35 ESG key issues that the method described herein may base its evaluation on. Exemplarily, the ESG key issues are grouped into 10 themes and 3 pillars. The computer system 102 may use the 35 key issues to generate the plurality of labels of the framework. For example, the computer system 102 may use the names of the key issues as labels. In that case, the framework shown in FIG. 4 has 35 labels named the same as the 35 key issues. In other examples, the computer system 102 may derive the label names from the key issue names. For example, the computer system 102 may omit commonly used words such as in, on, at, and, for. The key issue name "opportunities in nutrition and health" would become the label "opportunities nutrition health." The labels may also be generated from the key issues in any other way known to the skilled person. It is further to be noted that the MSCI Key Issues framework is merely an illustration. Any other framework known to the skilled person and suitable for document evaluation may be used. Examples of such other frameworks are the SASB Materiality Framework and the United Nations Sustainable Development Goals.

In step 220, the computer system 102 extracts a plurality of input sentences from each one of the plurality of electronic documents. The extraction may be performed in any way known to the skilled person. Illustratively, the open-source software library spaCy may be used, which is publicly available at spacy.io.spaCy uses the text of an electronic document that was extracted and stored as a single string in step 210 and generates a plurality of input sentences from that text. In other words, the text of each one of the plurality of electronic documents is split into a plurality of input sentences.

In step 230, the computer system 102 generates a plurality of input sentence embeddings from the plurality of input sentences. Each one of the plurality of input sentence embeddings corresponds to one of the plurality of input sentences. The computer system 102 generates the plurality of input sentence embeddings using a machine learning model. Illustratively, a sentence transformer model is used to map each input sentence in each of the pluralities of input sentences to a 384-dimensional dense vector space. Any suitable machine learning model may be used for this task, for example the pretrained model all-MiniLM-L6-v2, publicly available at huggingface.co/sentence-transformers/all-MiniLM-L6-v2, which is incorporated by reference herein in its entirety. The machine learning model may be accessed and executed by a library such as the SentenceTransformer Python package, publicly available at www.sbert.net/docs/package_reference/SentenceTransformer.html. The SentenceTransformer package uses the encoder function of the all-Mini-LM-L6-v2 model to generate a dense vector, i.e., an input sentence embedding, for each one of the input sentences. The output of this step is a plurality of input sentence embeddings, with each one of the input sentence embeddings corresponding to one input sentence in the pluralities of input sentences. While a specific machine learning model is described herein, it is expressly noted that any machine learning model suitable for transforming input sentences into input sentence embeddings may be used. Similarly, any suitable vector dimensionality may be used.

In step 240, the computer system 102 generates a plurality of label embeddings. Each one of the plurality of label embeddings corresponds to one of the plurality of labels. The computer system 102 generates the plurality of label embeddings using a machine learning model in a similar manner to what is described above with reference to step 230. Illustratively, the computer system 102 may use the same sentence transformer model all-MiniLM-L6-v2 and the same Sentence Transformer python package to generate label embeddings for the plurality of labels. The label embeddings may also be 384-dimensional dense vectors. The computer system 102 may use the encoder function of the all-Mini-LM-L6-v2 model to generate a dense vector, i.e., a label embedding, for each one of the labels. The output of this step is a plurality of label embeddings, with each one of the label embeddings corresponding to one of the plurality of labels. Again, while a specific machine learning model is described herein, it is expressly noted that any machine learning model suitable for transforming labels into label embeddings may be used. Similarly, any suitable vector dimensionality may be used.

In step 250, the computer system 102 calculates a plurality of similarity measures between each one of the plurality of input sentence embeddings and each one of the plurality of label embeddings. In an example, the similarity measures may be pairwise cosine similarity values, probabilities generated by zero-shot classification, or both. The pairwise cosine similarity values are computed as cosine similarities between each one of the plurality of input sentence embeddings and each one of the plurality of label embeddings. To compute the cosine similarity between the two vectors, the computer system 102 computes the dot product of the vectors divided by the product of their lengths, resulting in the cosine of the angle between the vectors. The cosine similarity therefore does not depend on the magnitudes of the vectors, but only on their angle. It is noted that any other similarity measure may be used instead of or in addition to pairwise cosine similarity. The computer system 102 then may filter the input sentence embedding-label embedding pairs to exclude pairs that have low cosine similarities. For example, the computer system 102 may filter out any input sentence embedding-label embedding pair with a cosine similarity of less than 0.35. This means that only input sentences with a higher cosine similarity to the corresponding label remain in the dataset. Any other suitable threshold, or no threshold, may be used.

The computer system 102 may also perform a zero-shot classification task on the filtered input sentence-label pairs. To this end, the computer system 102 may use natural language inference (NLI) to determine whether a given hypothesis logically follows from a premise. The filtered input sentences are used as the premises, and the labels are used as the hypotheses. In other words, for each one of the labels, i.e., for each one of the hypotheses, and each one of the input sentences, i.e., each one of the premises, the computer system 102 determines whether that hypothesis logically follows from that premise. The computer system 102 may utilize a machine learning model to perform this task, together with a suitable Python pipeline. For example, the computer system 102 may use the pretrained bart-large-mnli model, publicly available at huggingface.co/facebook/bart-large-mnli, which is incorporated by reference herein in its entirety. The computer system 102 may also use the zero-shot classification Python pipeline, publicly available at huggingface.co/tasks/zero-shot-classification, together with the pretrained model. The output of the zero-shot classification is a score that corresponds to the probability that a certain input sentence belongs to a class defined by a label.

In step 260, the computer system 102 generates a plurality of label sentences for each one of the plurality of labels based on the plurality of similarity measures. Each one of the plurality of label sentences is associated with one of the company identifiers. The computer system 102 may filter the input sentence-label probability scores calculated in step 250 to exclude input sentences that have a low probability of belonging to a certain label. For example, the computer system 102 may filter out any input sentence-label pair with a zero-shot classification score of 0.85 or less. Any other suitable threshold, or no threshold, may be used. The output of step 260 is thus a set of relevant input sentences for each one of the labels. The relevant input sentences form the plurality of label sentences for each one of the labels. Because each one of the input sentences stems from an electronic document that has an associated company identifier, each one of the input sentences extracted from that document, and therefore each one of the label sentences filtered from the input sentences, is also associated with that company identifier.

In step 270, the computer system 102 generates a plurality of entities for each one of the plurality of label sentences. Illustratively, the entities are generated using the DBpedia project, publicly described at dbpedia.org. DBpedia is an entity database that extracts structured content from Wikipedia and makes that structured information publicly available. The structured information allows users to semantically query relationships and properties of Wikipedia resources. DBpedia includes entities such as objects, events, people, situations, and abstract concepts. However, it is expressly noted that any other entity database known to the skilled person may be used alternatively to or in addition to DBpedia. A DBpedia Spotlight Application Programming Interface (API) may be used to automatically annotate mentions of DBpedia entities in text. This API is publicly available at dbpedia-spotlight.org/api. The computer system 102 may use the API on each one of the label sentences generated in step 260. The output of the API is a plurality of entities for each one of the plurality of label sentences for each one of the plurality of labels. In other words, the output is a mapping between label sentences and relevant entities for each one of the sentences for each label. The computer system 102 may utilize the labels filtered after zero-shot classification, as described above, or it may utilize the labels filtered after the calculation of the pairwise cosine similarity values, omitting the zero-shot classification step.

Figure 5:
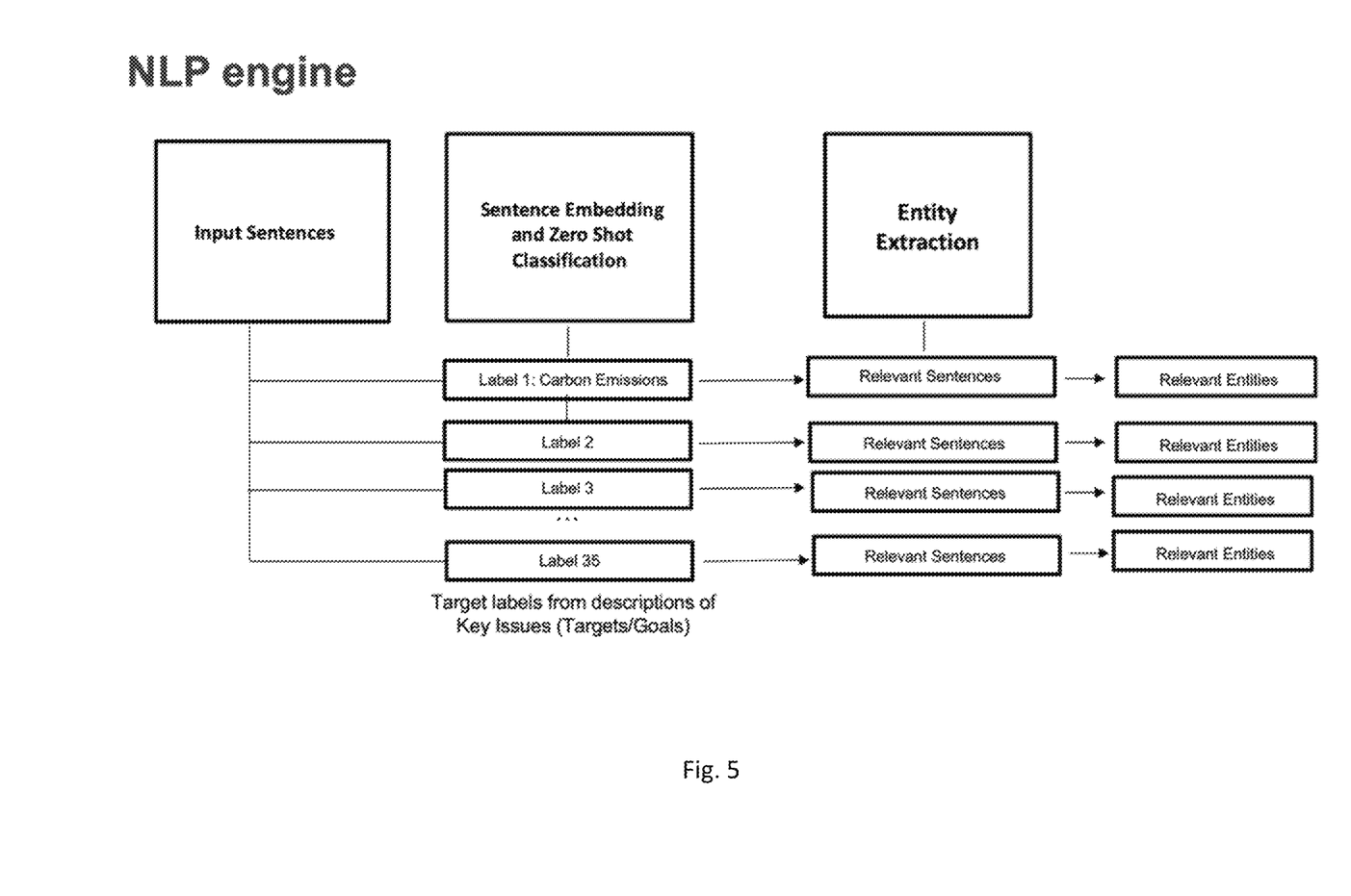
FIG. 5 is an illustration of NLP engine processing in accordance with an embodiment of the present invention.

FIG. 5 is an illustration of the NLP engine processes described above in accordance with an embodiment of the present invention. As can be seen and as described, the computer system 102 generates relevant label sentences for each one of the input labels. The computer system 102 then generates relevant entities for each one of the label sentences. Since the label sentences are associated with labels, the computer system 102 at the same time generates relevant entities for each one of the labels.

Figure 6:
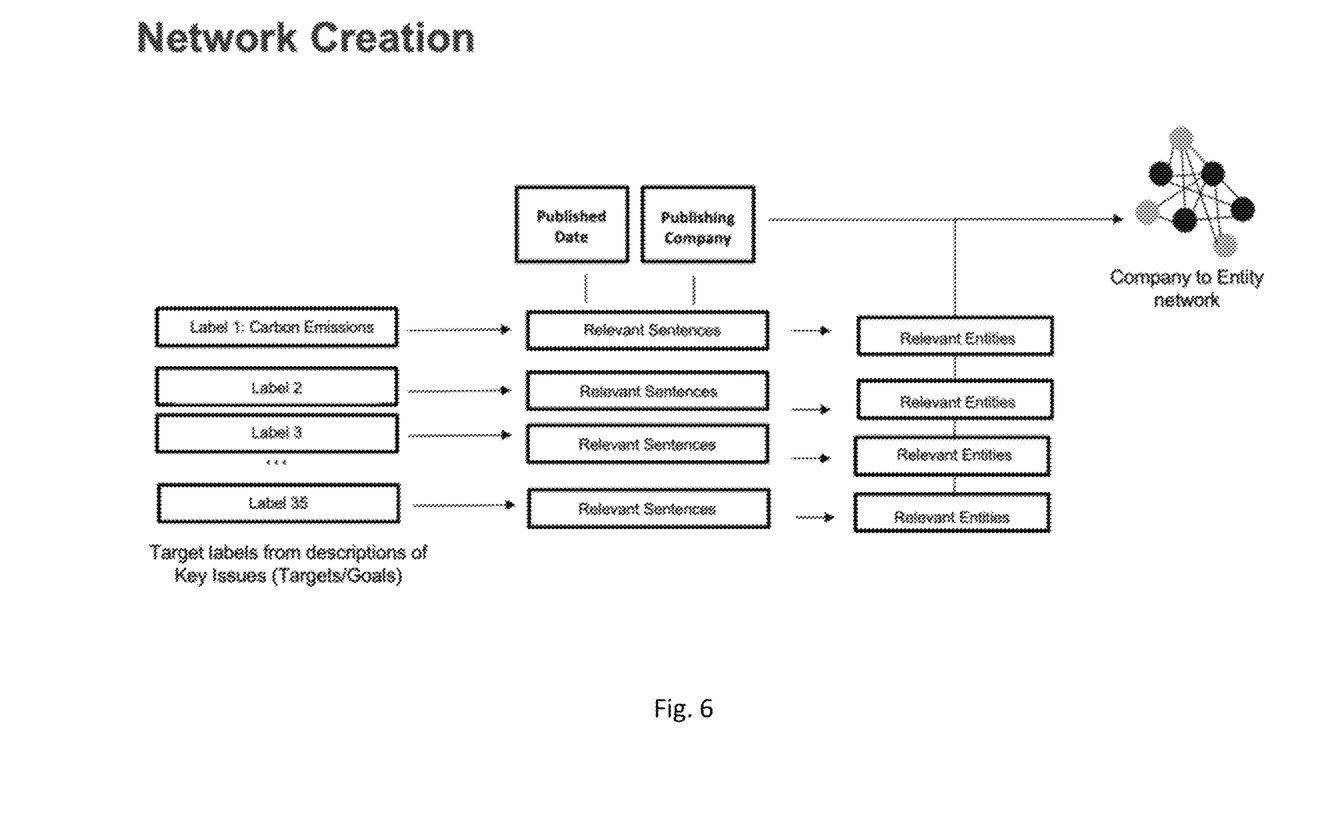
FIG. 6 is an illustration of network creation in accordance with an embodiment of the present invention.

In step 280, the computer system 102 generates a network based on the plurality of label sentences, the plurality of entities, and the plurality of company identifiers associated with the plurality of label sentences. FIG. 6 illustrates how the company-to-entity network is being generated using the labels, relevant label sentences (each one associated with a company identifier and, optionally, a date), and entities associated with the label sentences. In other words, the computer system 102 creates the network from the entities from each one of the label sentences and their connection with associated companies disclosing such entities in their electronic documents. The network includes a node for each one of the entities and a node for each one of the company identifiers. Edges between nodes exist between company identifier nodes and entity nodes, and between entity nodes and other entity nodes.

Figure 7A:
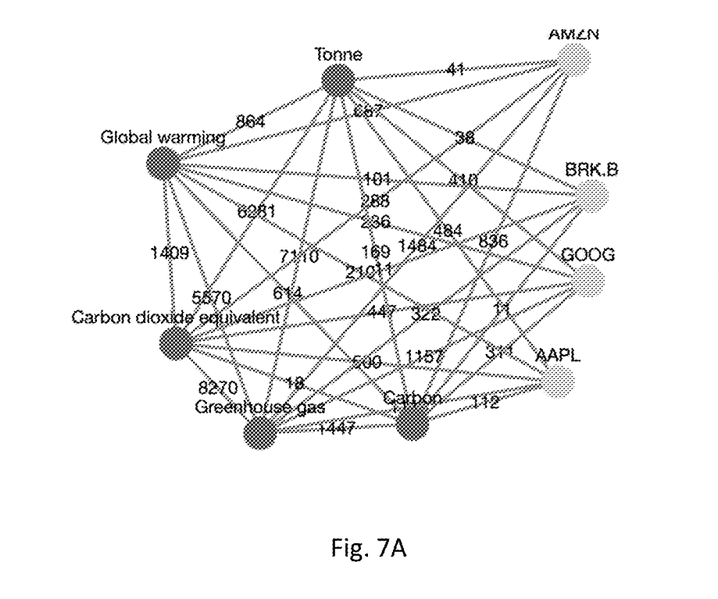
FIG. 7A is an illustration of a subset of a generated network in accordance with an embodiment of the present invention.

An edge value between a company identifier node and an entity node is calculated based on the number of mentions of the entity in the label sentences associated with that company identifier. For example, for the subset of a network shown in FIG. 7A, the label sentences associated with the company identified by the identifier "AAPL" include the entity "Carbon" 112 times, the entity "Carbon dioxide equivalent" 500 times, and the entity "Greenhouse gas" 1119 times. The label sentences associated with the company identified by the identifier "GOOG" include the entity "Carbon" 311 times, the entity "Carbon dioxide equivalent"

Figure 7B:
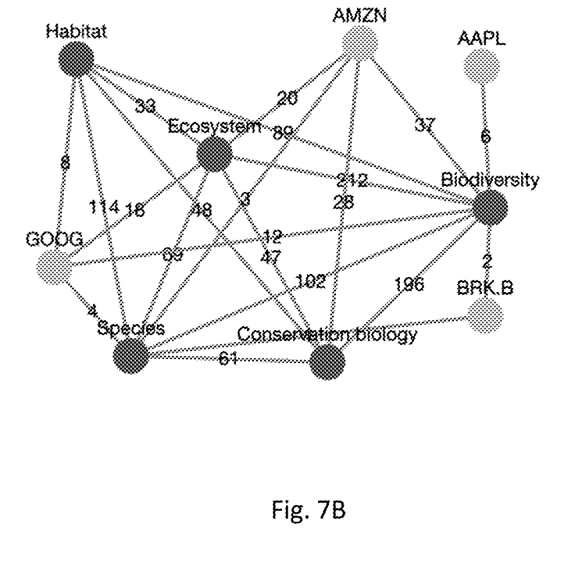
FIG. 7B is an illustration of a subset of a generated network in accordance with an embodiment of the present invention.

447 times, and the entity "Greenhouse gas" 1157 times. For the subset of a network shown in FIG. 7B, the label sentences associated with the company identified by the identifier "AMZN" include the entity "Biodiversity" 37 times and the entity "Ecosystem" 20 times. The label sentences associated with the company identified by the identifier "GOOG" include the entity "Biodiversity" 12 times and the entity "Ecosystem" 18 times.

An edge value between an entity node and another entity node is calculated based on how often both entities are included in a same label sentence of the plurality of label sentences. For example, for the subset shown in FIG. 7A, the entities "Carbon" and "Global warming" both appear in 614 of the label sentences, and the entities "Carbon dioxide equivalent" and "Global warming" both appear in 1409 of the label sentences. For the subset shown in FIG. 7B, the entities "Biodiversity" and "Ecosystem" both appear in 212 of the label sentences. The entities "Biodiversity" and "Species" both appear in 102 of the label sentences.

The computer system 102 may use all label sentences in the plurality of label sentences to generate the network. Alternatively, the computer system 102 may filter the plurality of label sentences before generating the network. For example, if each label sentence is associated with an electronic document that has a date, the generated network may be limited to a desired date range. Illustratively, the computer system 102 may generate the network for electronic documents and their extracted label sentences that have a date between Jan. 1, 2022, and Dec. 31, 2022. The computer system 102 may then ignore all label sentences that are associated with documents that have a date outside that date range. In another example, the computer system 102 may generate the network for electronic documents and their extracted label sentences up to a desired date, such as Dec. 31, 2022. The computer system 102 may then ignore all label sentences that are associated with documents that have a date after the desired date but may include all label sentences that are associated with documents that have a date before or on the desired date.

In step 290, the computer system 102 calculates a score based on the network generated in step 280. While any suitable scoring system known to the skilled person may be used, the computer system 102 may exemplarily calculate the score based on the personalized PageRank computed from the network generated in step 280. Personalized PageRank is a widely used node proximity measure in graph mining and network analysis. Given a source node and a target node, the personalized PageRank value represents the probability that a random walk from the source node terminates at the target node. It thus indicates the importance between the source node and the target node. The PageRank algorithm is described in detail in A. Langeville and C. Meyer, "A survey of eigenvector methods of web information retrieval.", SIAM Review, Vol. 47, No. 1, pp. 135-161 (2005), publicly available at epubs.siam.org/doi/pdf/10.1137/S0036144503424786, and in L. Page, S. Brin, R. Motwani, and T. Winograd, "The PageRank citation ranking: Bringing order to the web.", The Web Conference (1999), publicly available at ilpubs.stanford.edu:8090/422, both of which are incorporated by reference herein in their entireties. The computer system 102 may use a publicly available implementation of the personalized PageRank algorithm, such as the one provided by the Python NetworkX package available at networkx.org/documentation/stable/reference/algorithms/generated/network.algorithms.link_analysis.pagerank_alg.pagerank.html.

The computer system 102 computes the personalized PageRank for each one of the plurality of entity nodes as a source node to each one of the company nodes as target nodes. Thus, the personalized PageRank algorithm is executed as many times as there are entity nodes in the network. The damping parameter alpha may be set to 0.5, and the personalization vector may correspond to the respective entity node the algorithm is executed for. The result for each entity node is a set of probabilities, with each of the probabilities corresponding to a company node and indicating the probability that a random walk from the specific entity node terminates at that company node.

The computer system 102 may then calculate a plurality of company-label scores. Company-label scores, or company scores by label sentence, are calculated as the average personalized PageRank score for relevant entities by label sentence. For example, the computer system 102 may select all entities associated with a certain label sentence. Alternatively, the computer system 102 may select a subset of the entities associated with a certain label sentence. Illustratively and using the framework shown in FIG. 4, the computer system 102 may only select the entities associated with the label sentences for the 6 labels in the "governance" pillar. The average of the personalized PageRank scores for an entity node associated with one of the label sentences may further be normalized for all companies in the dataset. The computer system 102 may perform this normalization in any way known to the skilled person. For example, the computer system 102 may calculate a standard z-score of the average score and then apply a sigmoid function to it. The result is a normalized set of company-label scores representing the association of a specific company with a specific label. The computer system 102 then calculates a score for a company based on the normalized company-label scores associated with that company, either for all labels or for a subset of labels. The result is a score between 0 and 100, representing the company's alignment with the selected labels in the framework. In the example framework of FIG. 5, the resulting score is an ESG score that represents how much a company's electronic documents align with the 35 ESG key issues, or a subset thereof.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for evaluating electronic documents based on a framework having a plurality of labels, the method comprising: receiving, by a computer system, a plurality of electronic documents, each one of the plurality of electronic documents having a company identifier; extracting, by the computer system, a plurality of input sentences from each one of the plurality of electronic documents; generating, by the computer system using a machine learning model, a plurality of input sentence embeddings, each one of the plurality of input sentence embeddings corresponding to one of the plurality of input sentences; generating, by the computer system using the machine learning model, a plurality of label embeddings, each one of the plurality of label embeddings corresponding to one of the plurality of labels; calculating, by the computer system, a plurality of similarity measures between each one of the plurality of input sentence embeddings and each one of the plurality of label embeddings; calculating, by the computer system using a zero-shot classification based on natural language inference, a plurality of probability measures, each probability measure comprises a probability of each of the plurality of input sentences belonging to a class defined by each of the plurality of labels; generating, by the computer system, a plurality of label sentences for each one of the plurality of labels based on the plurality of similarity measures and the plurality of probability measures, the generating comprising: filtering pairs of the input sentences and labels using the probability measures to exclude at least one input sentence-label pair of which the input sentence has a low probability of belonging to the corresponding label; and filtering the pairs of the input sentences and labels using the similarity measures to exclude at least one input sentence-label pair that has a low degree of similarity between the input sentence and the corresponding label, wherein after the filtering, each of the input sentence in remaining ones of the pairs of the input sentences and labels forms each one of the plurality of label sentences being associated with one of the company identifiers; generating, by the computer system, a plurality of entities for each one of the plurality of label sentences; generating, by the computer system, a network based on the plurality of label sentences, the plurality of entities, and the plurality of company identifiers associated with the plurality of label sentences; and calculating, by the computer system, a score based on the network.

2. The computer-implemented method of claim 1, wherein the plurality of similarity measures include pairwise cosine similarity values.

3. The computer-implemented method of claim 1, wherein the network includes a plurality of entity nodes and a plurality of company nodes, and wherein calculating the score further comprises:
   calculating, by the computer system, a PageRank score for each one of the plurality of entity nodes;
   calculating, by the computer system, a plurality of company-label scores based on an average of the PageRank scores of all entity nodes associated with a corresponding one of the plurality of label sentences; and
   calculating, by the computer system, the score based on the plurality of company-label scores.

4. The computer-implemented method of claim 3, wherein calculating the score is based on all company-label scores.

5. The computer-implemented method of claim 3, wherein calculating the score is based on a subset of the plurality of company-label scores associated with selected ones of the plurality of labels.

6. The computer-implemented method of claim 1, wherein generating the plurality of entities is based on an entity database.

7. The computer-implemented method of claim 1, wherein each one of the plurality of electronic documents has a date and wherein generating the network is further based on the plurality of dates.

8. The computer-implemented method of claim 1, wherein the electronic documents are ESG documents and wherein the score is an ESG score.

9. A system for evaluating electronic documents based on a framework having a plurality of labels, the system comprising:
   a computer system having a processor coupled to a memory; and
   a machine learning model residing on the computer system and configured to be executed by the processor, wherein the processor is configured to:
      receive a plurality of electronic documents, each one of the plurality of electronic documents having a company identifier;
      extract a plurality of input sentences from each one of the plurality of electronic documents;
      generate, using the machine learning model, a plurality of input sentence embeddings, each one of the plurality of input sentence embeddings corresponding to one of the plurality of input sentences;

generate, using the machine learning model, a plurality of label embeddings, each one of the plurality of label embeddings corresponding to one of the plurality of labels;

calculate a plurality of similarity measures between each one of the plurality of input sentence embeddings and each one of the plurality of label embeddings;

calculate, using a zero-shot classification based on natural language inference, a plurality of probability measures, each probability measure comprises a probability of each of the plurality of input sentences belonging to a class defined by each of the plurality of labels;

generate a plurality of label sentences for each one of the plurality of labels based on the plurality of similarity measures and the plurality of probability measures, the generate comprising, comprising:

filter pairs of the input sentences and labels using the probability measures to exclude at least one input sentence-label pair of which the input sentence has a low probability of belonging to the corresponding label; and filter the pairs of the input sentences and labels using the similarity measures to exclude at least one input sentence-label pair that has a low degree of similarity between the input sentence and the corresponding label, wherein after the filtering, each of the input sentence in remaining ones of the pairs of the input sentences and labels forms each one of the plurality of label sentences being associated with one of the company identifiers;

generate a plurality of entities for each one of the plurality of label sentences;

generate a network based on the plurality of label sentences, the plurality of entities, and the plurality of company identifiers associate with the plurality of label sentences; and calculate a score based on the network.

10. The system of claim 9, wherein the plurality of similarity measures include pairwise cosine similarity values.

11. The system of claim 9, wherein the network includes a plurality of entity nodes and a plurality of company nodes, and wherein the processor is further configured to:

calculate a PageRank score for each one of the plurality of entity nodes;

calculate a plurality of company-label scores based on an average of the PageRank scores of all entity nodes associated with a corresponding one of the plurality of label sentences; and calculate the score based on the plurality of company-label scores.

12. The system of claim 11, wherein the processor is configured to calculate the score based on all company-label scores.

13. The system of claim 11, wherein the processor is configured to calculate the score based on a subset of the plurality of company-label scores associated with selected ones of the plurality of labels.

14. The system of claim 9, wherein the processor is configured to generate the plurality of entities based on an entity database.

15. The system of claim 9, wherein each one of the plurality of electronic documents has a date and wherein the processor is further configured to generate the network based on the plurality of dates.

16. The system of claim 9, wherein the electronic documents are ESG documents and wherein the score is an ESG score.

17. A non-transitory computer-readable medium having software encoded thereon for evaluating electronic documents based on a framework having a plurality of labels, the software, when executed by one or more computer systems operable to:

receive a plurality of electronic documents, each one of the plurality of electronic documents having a company identifier;

extract a plurality of input sentences from each one of the plurality of electronic documents;

generate, using a machine learning model, a plurality of input sentence embeddings, each one of the plurality of input sentence embeddings corresponding to one of the plurality of input sentences;

generate, using the machine learning model, a plurality of label embeddings, each one of the plurality of label embeddings corresponding to one of the plurality of labels;

calculate a plurality of similarity measures between each one of the plurality of input sentence embeddings and each one of the plurality of label embeddings;

calculate, using a zero-shot classification based on natural language inference, a plurality of probability measures, each probability measure comprises a probability of each of the plurality of input sentences belonging to a class defined by each of the plurality of labels;

generate a plurality of label sentences for each one of the plurality of labels based on the plurality of similarity measures and the plurality of probability measures, the generate comprises:

filter pairs of the input sentences and labels using the probability measures to exclude at least one input sentence-label pair of which the input sentence has a low probability of belonging to the corresponding label; and filter the pairs of the input sentences and labels using the similarity measures to exclude at least one input sentence-label pair that has a low degree of similarity between the input sentence and the corresponding label, wherein after the filtering, each of the input sentence in remaining ones of the pairs of the input sentences and labels forms each one of the plurality of label sentences being associated with one of the company identifiers;

generate a plurality of entities for each one of the plurality of label sentences;

generate a network based on the plurality of label sentences, the plurality of entities, and the plurality of company identifiers associated with the plurality of label sentences; and calculate a score based on the network.

18. The non-transitory computer-readable medium of claim 17, wherein each one of the plurality of electronic documents has a date and wherein the software is further operable to generate the network based on the plurality of dates.

* * * * *